No. 748,414. PATENTED DEC. 29, 1903.
E. PASSBURG.
FILLING OR EMPTYING APPARATUS FOR VACUUM DRIERS.
APPLICATION FILED MAY 5, 1903.
NO MODEL. 2 SHEETS—SHEET 1.
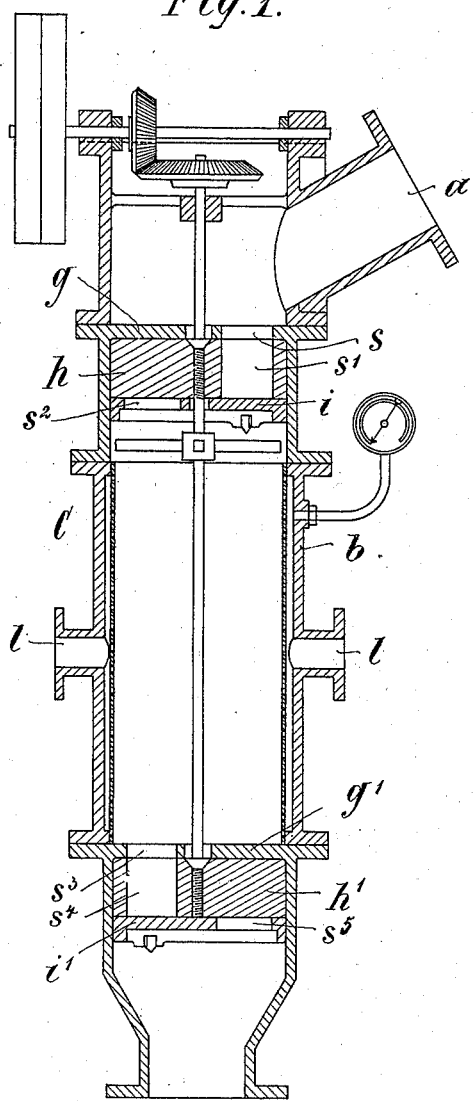
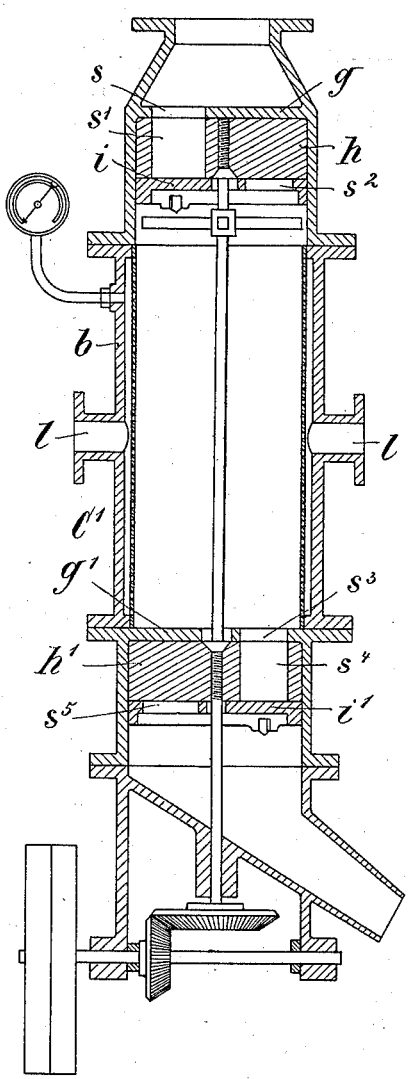

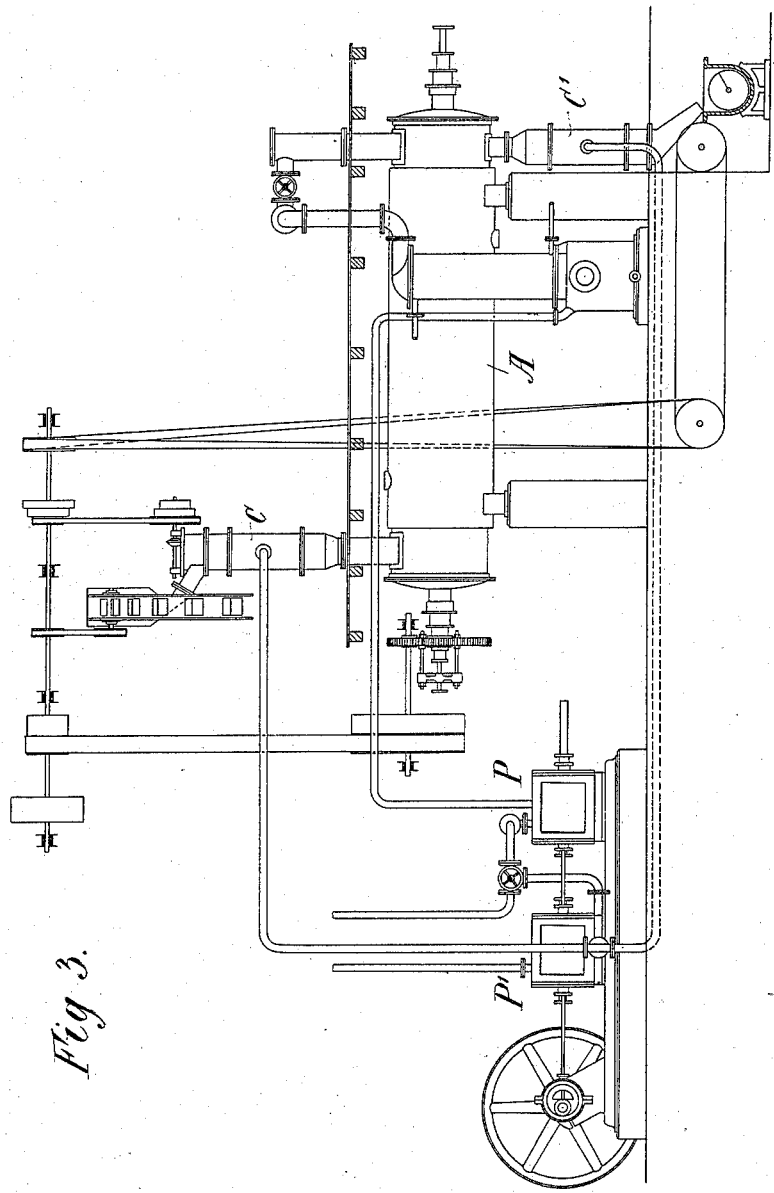

No. 748,414.

Patented December 29, 1903.

UNITED STATES PATENT OFFICE.

EMIL PASSBURG, OF BERLIN, GERMANY.

FILLING OR EMPTYING APPARATUS FOR VACUUM-DRIERS.

SPECIFICATION forming part of Letters Patent No. 748,414, dated December 29, 1903.

Application filed May 5, 1903. Serial No. 155,768. (No model.)

*To all whom it may concern:*

Be it known that I, EMIL PASSBURG, engineer, a citizen of the German Empire, and a resident of No. 33 Brücken Allee, in the city of Berlin, Kingdom of Prussia, German Empire, have invented certain new and useful Improvements in Automatically - Working Filling or Emptying Apparatus on Vacuum Drying Apparatus for Grain and other Substances, of which the following is a specification.

The vacuum drying apparatus with heating-bodies, stirring and transporting scoops hitherto in use are mostly periodically filled and emptied, which is of advantage for substances containing a large amount—from thirty to ninety per cent.—of water, as for the purpose of driving out this great quantity of water a prolonged contact of the material to be dried with the heating-surfaces is required. When drying grain harvested in a damp condition, there is, however, as a rule, only from five to ten per cent. of water to be removed in order to obtain a product ready for storing, and it is consequently advisable to expose the grain only for a short time to the effect of the heat, so as not to get it overheated, and thereby become of less value. In order to use the rotating vacuum drying apparatus now in use for the drying of grain, it is for this reason necessary to have them frequently filled and emptied, whereby each time air enters the apparatus and breaks the vacuum. The necessity of reëstablishing the same constitutes a loss of time and money and does not admit of treating large quantities of material by this process. As a fact, there are already continuous and automatically working filling and emptying devices of my own construction and others in use for vacuum drying apparatus which convey the wet material in a continuous manner to the drying apparatus and remove it from the same, while excluding the air as far as possible; but these apparatus have thus far not given complete satisfaction, as it was impossible to prevent the air from entering the vacuum-cylinder on the material being put in and taken out, and thereby reduce the vacuum. Through this reduction of the vacuum, however, the drying process was not only interfered with and prolonged, but it was also made impossible to maintain constantly such a high vacuum in the cylinder as required for attaining a faultless condition of the grain. I have therefore invented for my continuously-working filling and emptying devices known and used at present and for similar devices an arrangement by which the noxious entrance of air is prevented and the preservation of a high vacuum in the drying apparatus made possible. This new device I will now describe in connection with one of the forms of construction of my automatic filling and emptying mechanism of a vacuum drying apparatus.

In the drawings, Figure 1 represents an apparatus C, serving to feed the material to be dried into the vacuum apparatus. Fig. 2 shows the removing or emptying apparatus, and Fig. 3 a drying plant with the new devices.

Similar letters refer to similar parts throughout the several views.

The filling apparatus C is provided with a feed-opening $a$. In the latter there are arranged a stationary upper plate $g$, with the notch $s$, the rotating center plate $h$, with the notch $s'$, and the lower stationary plate $i$, with the notch $s^2$. To this system of plates there is connected a body $b$, carrying one or several air-pump sockets $l$. The lower part of this body $b$ is closed by a similar system of plates as the above described.

Fig. 1 represents the position of the upper system at the moment in which the material to be dried falls from the feed-opening $a$ into the notch $s'$. On its further rotation, over ninety degrees, the plate $k$, with its notch $s'$, arrives over the notch $s^2$ of the stationary plate $i$, in consequence of which the drying material stored up in $s$ falls into the intermediate body $b$ through the notch $s^2$, whereby at the same time the air admitted with the drying material enters into $b$. At this moment, however, is the communication of the body $b$ with the vacuum apparatus A, Sheet 2, interrupted through the position of the rotating plate $h'$ of the lower system of plates which separates the body $b$ hermetically from the vacuum apparatus, so that the air carried along with the material to be dried cannot enter the vacuum apparatus A. The body $b$ stands through the air-pump pipe $l$ in communication with an air-pump acting independently of the air-pump which evacuates the drying apparatus. The first-mentioned air-pump removes the air found in $b$, while the plate $h'$ continues its rotation until notch $s^4$ is filled with the material to be dried, from which the air has been drawn in the meantime, which on the further rotation of the plate $h'$ beyond ninety degrees is emptied into the vacuum apparatus through notch $s^5$. In order to attain a good effect—that is to say, to remove the air as completely as possible from the body $b$ within the space of time in which the plates $h$ and $h'$ make about one-half of a rotation—it is of course necessary to have an air-pump of sufficient efficiency.

The object of the emptying apparatus C', Fig. 2, is to remove the dried material from the vacuum-space to the atmosphere without allowing the air to enter the vacuum-drier A, Fig. 3, Sheet 2, and it is of the same construction as the above-described filling apparatus, with an upper system of plates, intermediate body $b$, and lower system of plates. Also out of this intermediate body $b$ the air-pump sucks the air which enters after the emptying of the section $s$ into $b$ on the further rotation of the plate $h'$ before it can enter through the notches $s^2$, $s'$, and $s$ into the vacuum apparatus. Through the described arrangement it is possible to attain a high and constant vacuum in the drying apparatus.

Sheet 2, Fig. 3, represents a drying plant in which, as an illustration, grain or any other material to be dried is conveyed to the drying apparatus by the above-described filling apparatus C hermetically and automatically and is removed from the same through the emptying apparatus C', while the air-pump cylinder P evacuates the vacuum apparatus and the air-pump cylinder P' the two intermediate bodies $b$. Hereby the arrangement can be made that the air-pump P', if it is of a sufficient size, creates a vacuum behind the valve-chamber or the slide-valves of the air-pump MP, whereby a compound action with a higher vacuum in the drying apparatus A is attained.

Of course on the filling and emptying side there may be arranged more than two sets of plates $h$ and $h'$ above each other, and all the hollow spaces between two sluices formed in this way may be separately evacuated. The evacuation of these intermediate bodies can be effected by one of the described air-pumps or by any other suitable device.

What I claim as my invention, and desire to secure by Letters Patent of the United States, is—

1. An automatic continuously-working filling and emptying device for vacuum-driers, consisting of a pair of suitable closing devices, an intermediate chamber between said closing devices, and an air-sucking device connected with said chamber, substantially as set forth.

2. The combination, with a vacuum-chamber, of automatic continuously-working filling and emptying devices located respectively at the inlet and outlet of said vacuum-chamber, each of said devices consisting of a pair of suitable closing devices, an intermediate chamber between said closing devices, and an air-sucking device connected with said chamber, substantially as set forth.

3. The combination, with a vacuum-chamber, of automatic continuously-working filling and emptying devices located respectively at the inlet and outlet of said vacuum-chamber, each of said devices consisting of a plurality of pairs of suitable closing devices, an intermediate chamber between each pair of said closing devices, and an air-sucking device connected with each of said intermediate chambers, substantially as set forth.

In testimony that I claim the foregoing as my invention I have signed my name in presence of two subscribing witnesses.

EMIL PASSBURG.

Witnesses:
HENRY HASPER,
WOLDEMAR HAUPT.